United States Patent
You et al.

(10) Patent No.: US 11,824,177 B2
(45) Date of Patent: Nov. 21, 2023

(54) BATTERY PACK, METHOD FOR MANUFACTURING BATTERY PACK AND VEHICLE

(71) Applicant: CONTEMPORARY AMPEREX TECHNOLOGY CO., LIMITED, Fujian (CN)

(72) Inventors: Kaijie You, Fujian (CN); Yongguang Wang, Fujian (CN); Peng Wang, Fujian (CN); Linggang Zhou, Fujian (CN); Xingdi Chen, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 434 days.

(21) Appl. No.: 15/734,553

(22) PCT Filed: May 20, 2020

(86) PCT No.: PCT/CN2020/091228
§ 371 (c)(1),
(2) Date: Dec. 2, 2020

(87) PCT Pub. No.: WO2020/259135
PCT Pub. Date: Dec. 30, 2020

(65) Prior Publication Data
US 2021/0167441 A1  Jun. 3, 2021

(30) Foreign Application Priority Data
Jun. 27, 2019 (CN) .......................... 201910565343.5

(51) Int. Cl.
*H01M 10/6554* (2014.01)
*H01M 10/613* (2014.01)
(Continued)

(52) U.S. Cl.
CPC ..... *H01M 10/6554* (2015.04); *H01M 10/613* (2015.04); *H01M 50/204* (2021.01);
(Continued)

(58) Field of Classification Search
CPC ............. H01M 50/204; H01M 50/233; H01M 50/249; H01M 10/613; H01M 10/6554
See application file for complete search history.

(56) References Cited

U.S. PATENT DOCUMENTS

2020/0161728 A1*  5/2020  Wang ................ H01M 10/6554

FOREIGN PATENT DOCUMENTS

CN       201804918 U      4/2011
CN       104037373 A      9/2014
(Continued)

OTHER PUBLICATIONS

Xu, G. et al., "Cell production. Electrochemical Equipment and Engineering Design", China University of Mining and Technology Press, 2018, p. 148-149.
(Continued)

*Primary Examiner* — Jonathan G Jelsma
(74) *Attorney, Agent, or Firm* — Scully, Scott, Murphy & Presser, P.C.

(57) ABSTRACT

The present application relates to a battery pack, a method for manufacturing a battery pack and a vehicle. The battery pack includes a case assembly including a case, a thermally conductive beam and a temperature control component, the thermally conductive beam being disposed in the case and connected to the case, and the temperature control component being disposed in a bottom region of the case; a thermally conductive cover connected to the thermally conductive beam and located above the thermally conductive beam along a height direction of the battery pack, where the thermally conductive cover, the case and the thermally
(Continued)

conductive beam enclose and form a first chamber; and a plurality of battery cells integrally forming a battery assembly, the battery assembly being disposed in the first chamber and located above the temperature control component.

18 Claims, 6 Drawing Sheets

(51) Int. Cl.
*H01M 50/249* (2021.01)
*H01M 50/204* (2021.01)
*H01M 50/233* (2021.01)

(52) U.S. Cl.
CPC ....... *H01M 50/233* (2021.01); *H01M 50/249* (2021.01); *H01M 2220/20* (2013.01)

(56) References Cited

FOREIGN PATENT DOCUMENTS

| | | | |
|---|---|---|---|
| CN | 106025126 A | 10/2016 | |
| CN | 106549197 A | 3/2017 | |
| CN | 207504140 U | 6/2018 | |
| CN | 207572496 U | 7/2018 | |
| CN | 108777336 A | 11/2018 | |
| CN | 208489245 U | 2/2019 | |
| CN | 109686894 A | 4/2019 | |
| CN | 109802194 A | 5/2019 | |
| CN | 111987248 A | * 11/2020 | .......... H01M 10/613 |
| DE | 10 2016 212 273 A1 | 1/2018 | |
| JP | 2004047208 A | 2/2004 | |
| JP | 2010-519712 A | 6/2010 | |
| JP | 2013149400 A | 8/2013 | |
| JP | 2014093241 A | 5/2014 | |
| JP | 2015210894 A | 11/2015 | |
| JP | 2017228364 A | 12/2017 | |

OTHER PUBLICATIONS

Xiao, J., "Lithium-ion battery cell structure", Fundamentals of Pure Electric Cars, Hubei Science and Technology Press, 2018, p. 93-94.
First Office Action dated Jul. 25, 2023 received in Chinese Patent Application No. CN 202111581879.X.

* cited by examiner

BATTERY PACK, METHOD FOR MANUFACTURING BATTERY PACK AND VEHICLE

CROSS-REFERENCE TO RELATED APPLICATIONS

This application is a national stage of International Application No. PCT/CN2020/091228, filed on May 20, 2020, which claims priority to Chinese Patent Application No. 201910565343.5, filed on Jun. 27, 2019. Both of the aforementioned applications are hereby incorporated by reference in their entireties.

TECHNICAL FIELD

The present application relates to the technical field of batteries, in particular to a battery pack, a method for manufacturing a battery pack, and a vehicle.

BACKGROUND

In recent years, rechargeable batteries have been widely applied to powering high-power devices, such as electric vehicles. The rechargeable batteries can achieve larger capacity or power by connecting a plurality of battery cells in series, in parallel or in series and parallel.

Various battery cells integrally form a battery assembly. In order to take away heat generated during a working process of the battery assembly so that a battery pack has good working performance, a prior art known to the inventor is to provide a temperature control system for cooling at the bottom of a case.

However, when such a temperature control system is utilized to cool the battery assembly, since the temperature control system can only cool one side of the battery assembly, the other side is completely dependent on the battery assembly itself for heat transfer, and it is easy to cause the battery assembly to form a temperature difference in a height direction. The side of the battery assembly close to the temperature control system has a faster cooling rate, and an effect of adjustment by the temperature control system is more obvious, while the side of the battery assembly away from the temperature control system has a slower cooling rate, and an effect of adjustment by the temperature control system is poorer. When the temperature difference between the two sides of the battery assembly is large for a long term, a service life of the battery assembly will be affected.

SUMMARY

Embodiments of the present application provide a battery pack, a method for manufacturing a battery pack, and a vehicle, which can increase a service life of the battery pack.

According to an aspect of the present application, there is provided a battery pack, including:
 a case assembly including a case, a thermally conductive beam and a temperature control component, the thermally conductive beam being disposed in the case and connected to the case, and the temperature control component being disposed in a bottom region of the case;
 a thermally conductive cover connected to the thermally conductive beam and located above the thermally conductive beam along a height direction of the battery pack, where the thermally conductive cover, the case and the thermally conductive beam enclose and form a first chamber; and
 a plurality of battery cells integrally forming a battery assembly, the battery assembly being disposed in the first chamber and above the temperature control component.

In some embodiments, the battery pack further includes a thermal barrier layer disposed between a bottom surface of the battery assembly and an inner bottom surface of the case, where a thermal conductivity coefficient of the thermal barrier layer is smaller than a thermal conductivity coefficient of the thermally conductive beam or the thermally conductive cover.

In some embodiments, the thermally conductive cover and the thermally conductive beam adopt contact heat conduction.

In some embodiments, the thermally conductive cover and a top of the battery assembly adopt contact heat conduction.

In some embodiments, at least one of the thermally conductive beam and the thermally conductive cover, and a side surface of the battery assembly away from a pole adopt contact heat conduction.

In some embodiments, the thermally conductive cover includes a main body part and a mounting part connected to the main body part, the main body part covers the battery assembly, and the mounting part is fixedly connected to the thermally conductive beam.

In some embodiments, the battery pack further includes a first thermally conductive layer disposed between the mounting part and the thermally conductive beam.

In some embodiments, the battery pack further includes a second thermally conductive layer disposed between the main body part and the thermally conductive beam, and a side surface of the battery assembly away from a pole.

In some embodiments, the battery pack further includes a third thermally conductive layer disposed between the main body part and a top of the battery assembly.

In some embodiments, the battery pack further includes a cover body disposed on the top of the thermally conductive cover, fixed and sealed with the case.

In some embodiments, the battery cell includes a housing and an electrode assembly disposed in the housing, and the electrode assembly includes a first electrode sheet, a second electrode sheet, and a diaphragm disposed between the first electrode sheet and the second electrode sheet;
 where the electrode assembly is in a coiled structure and is flat-shaped, and an outer surface of the electrode assembly includes two flat surfaces; or, the electrode assembly is in a laminated structure, and the first electrode sheet and the second electrode sheet are disposed in a stacking manner; and
 the flat surfaces of the electrode assembly or a plane where the first electrode sheet is located is disposed to face a bottom surface of the case, and the plurality of battery cells are provided with a single layer or at least two layers disposed in a stacking manner along the height direction of the battery pack.

In other embodiments, the battery cell includes a housing and an electrode assembly disposed in the housing, and the electrode assembly includes a first electrode sheet, a second electrode sheet, and a diaphragm disposed between the first electrode sheet and the second electrode sheet;
 where the electrode assembly is in a coiled structure and is flat-shaped, and an outer surface of the electrode assembly includes two flat surfaces; or, the electrode assembly is in a laminated structure, and the first electrode sheet and the second electrode sheet are disposed in a stacking manner; and the flat surfaces of the electrode assembly or a plane where the first electrode sheet is located is disposed to face a side surface of the case, and the plurality of battery cells are disposed in a stacking manner along a length direction or a width direction of the battery pack.

In some embodiments, the battery assembly is divided into at least two groups in a plane perpendicular to the height direction of the battery pack, and the thermally conductive beam and a side surface of the battery assembly away from a pole adopt contact heat conduction, and a grouping direction of the battery assembly is perpendicular to an extension direction of the thermally conductive beam.

In some embodiments, a ratio of a thickness of the thermal barrier layer to a height of the thermally conductive beam ranges from 1/5 to 1/500; and/or a ratio of the thermal conductivity coefficient of the thermal barrier layer to the thermal conductivity coefficient of the thermally conductive beam or the thermally conductive cover ranges from 0.001 to 0.5.

In some embodiments, the battery pack further includes a thermal barrier layer disposed between a bottom of the battery assembly and an inner bottom surface of the case.

In some embodiments, a ratio of a thickness of the first thermally conductive layer to a thickness of the thermal barrier layer ranges from 0.0001 to 0.1.

In some embodiments, a ratio of a thermal conductivity coefficient of the first thermally conductive layer to a thermal conductivity coefficient of the thermal barrier layer ranges from 20 to 1000.

In some embodiments, a ratio of a thickness of the second thermally conductive layer to a thickness of the thermal barrier layer ranges from 0.0001 to 0.1.

In some embodiments, a ratio of a thermal conductivity coefficient of the second thermally conductive layer to a thermal conductivity coefficient of the thermal barrier layer ranges from 20 to 1000.

In some embodiments, a ratio of a thickness of the third thermally conductive layer to a thickness of the thermal barrier layer ranges from 0.0001 to 0.1.

In some embodiments, a ratio of a thermal conductivity coefficient of the third thermally conductive layer to a thermal conductivity coefficient of the thermal barrier layer ranges from 20 to 1000.

According to another aspect of the present application, there is provided a vehicle, including:

a vehicle main body; and the battery pack of the above embodiments, where the battery pack is disposed in the vehicle main body.

According to a third aspect of the present application, there is provided a method for manufacturing a battery pack, including:

providing a case assembly including a case, a thermally conductive beam and a temperature control component, the thermally conductive beam being disposed in the case and connected to the case, and the temperature control component being disposed in a bottom region of the case;

providing a thermally conductive cover connected to the thermally conductive beam and located above the thermally conductive beam along a height direction of the battery pack, where the thermally conductive cover, the case and the thermally conductive beam enclose and form a first chamber; and providing a plurality of battery cells integrally forming a battery assembly, the battery assembly being disposed in the first chamber and above the temperature control component. Based on the above technical solutions, a battery pack of one embodiment of the present application is provided with a thermally conductive beam and a thermally conductive cover, so that while a temperature control component adjusts temperature at a bottom of a case, the heat can be transferred to the thermally conductive beam and the thermally conductive cover in sequence, which changes a thermal conduction path of temperature adjustment and control on a battery assembly by the temperature control component, can balance temperature distribution in a first chamber along a height direction of the battery pack, reduce a temperature difference between upper and lower regions of the battery assembly, improve the extent of temperature uniformity of the battery assembly, and make consistency of a depth of discharge of the battery assembly improved, thereby increasing a service life of the battery pack.

BRIEF DESCRIPTION OF THE DRAWINGS

The accompanying drawings described herein are intended to provide further understanding of the present application and constitute part of the present application, and illustrative embodiments of the present application and description thereof are used for explaining the present application and do not constitute an undue limitation to the present application. In the drawings.

DESCRIPTION OF REFERENCE SIGNS

Figure 1:
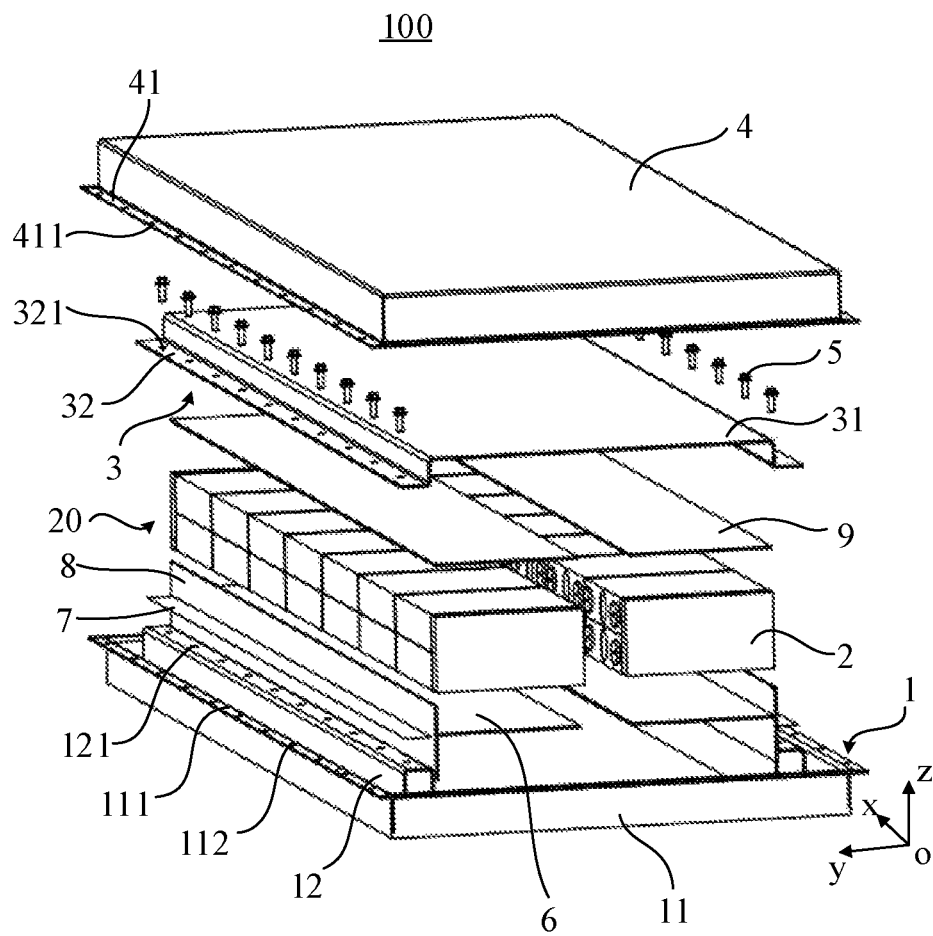
FIG. 1 is a schematic exploded diagram of an embodiment of a battery pack of the present application.

1. Case assembly; 11. Case; 111. First flange; 112. First hole; 12. Thermally conductive beam; 121. Second hole; 13. Temperature control component;

2. Battery cell; 20. Battery assembly; 20'. Plate; 21. Housing; 22. Electrode assembly; 221. First electrode sheet; 222. Second electrode sheet; 223. Diaphragm;

224. Flat surface; 23. Adapter plate; 24. Cover plate assembly; 241. Cover plate; 242. First electrode terminal; 243. Second electrode terminal;
3. Thermally conductive cover; 31. Main body part; 32. Mounting part; 321. Third hole;
4. Cover body; 41. Second flange; 411. Fourth hole;
5. Fastener; 6. Thermal barrier layer; 7. First thermally conductive layer; 8. Second thermally conductive layer; 9. Third thermally conductive layer.

DESCRIPTION OF EMBODIMENTS

The present application will be described in detail below. In the following paragraphs, different aspects of embodiments are defined in more detail. Various aspects defined in this way can be combined with any other aspect or aspects, unless it is clearly indicated that they cannot be combined. In particular, any feature considered to be preferred or advantageous may be combined with one or more other features considered to be preferred or advantageous.

The terms "first", "second" and the like in the present application are only for convenience of description, and are used to distinguish different components with the same name, rather than to indicate a specific order or primary-secondary relationship.

In addition, when an element is referred to as being "on" another element, the element may be directly on the other element, or may be indirectly on the other element with one or more intermediate elements interposed therebetween. In addition, when an element is referred to as being "connected to" another element, the element may be directly connected to the other element, or may be indirectly connected to the other element with one or more intermediate elements interposed therebetween. In the following, the same reference signs denote the same elements.

The phrase "a plurality of" in the present application refers to more than two (including two). Similarly, the phrase "a plurality of groups" refers to more than two groups (including two groups), and the phrase "a plurality of lengths" refers to more than two lengths (including two lengths).

In order to clearly describe various orientations in the following embodiments, a coordinate system in FIG. 1 for example defines various directions of a battery pack, in which an x direction represents a length direction of the battery pack; a y direction represents a width direction of the battery pack; and a z direction is perpendicular to a plane formed by the x direction and the y direction and represents a height direction of the battery pack. When the battery pack is installed on a vehicle, the height direction of the battery pack is parallel to a vertical direction. The vertical direction mentioned here is allowed to have a certain angular deviation from a theoretical vertical direction. Based on such definition of the orientation, "up", "down", "top" and "bottom" are used, all of which are relative to the height direction.

In some embodiments, the present application provides a vehicle. The vehicle includes a vehicle main body and a battery pack, and the battery pack is disposed in the vehicle main body. The vehicle is a new-energy vehicle, which may be a battery electric vehicle, or may also be a hybrid electric vehicle or an extended-range vehicle. A drive motor is disposed in the vehicle main body, and the drive motor is electrically connected to the battery pack. The battery pack provides electrical energy, and the drive motor is connected to wheels on the vehicle main body through a transmission mechanism to drive the vehicle to travel. Preferably, the battery pack may be horizontally disposed at the bottom of the vehicle main body, and can be installed by top-hung and/or bottom-supported methods.

FIG. 1 is a schematic structural diagram of an embodiment of a battery pack of the present application. The battery pack 100 includes a case assembly 1, a thermally conductive cover 3 and a plurality of battery cells 2 integrally forming a battery assembly 20.

The case assembly 1 includes a case 11, a thermally conductive beam 12 and a temperature control component 13. The case 11 has an opening end, and the thermally conductive beam 12 is fixed in the case 11 and connected to the case 11 so that the temperature control component 13, the case 11, the thermally conductive beam 12 and the thermally conductive cover 3 can conduct heat to one another, for example, the thermally conductive beam 12 can be fixed on an inner bottom surface or a side wall of the case 11. The temperature control component 13 is disposed in a bottom region of the case 11, and can be provided inside or outside the case 11, or integrated with a bottom plate of the case 11. The temperature control component 13 is used to adjust temperature of the battery assembly 20, for example, in order to take away heat generated during a working process of the battery assembly 20, the battery assembly 20 may be cooled. The temperature control component 13 includes a cooling pipe arranged at the bottom of the case 11 and a circulating component for feeding a cooling liquid into the cooling pipe; or the temperature control component 13 includes a liquid cooling plate disposed at the bottom of the case 11; or when the battery pack is used in a low temperature area, the battery cells of the battery assembly 20 can be heated, and the temperature control component 13 is included in an electric heating element arranged at the bottom of the case 11 or the like.

The thermally conductive cover 3 is connected to the thermally conductive beam 12 and is located above the thermally conductive beam 12 along a height direction of the battery pack. The thermally conductive cover 3, the inner bottom surface of the case 11 and an inner side surface of the thermally conductive beam 12 form a first chamber A. Preferably, a size of the first chamber A is adapted to overall external size of each battery cell 2. The battery assembly 20 is disposed in the first chamber A and above the temperature control component 13 so that the temperature control component 13 can adjust temperature under the battery assembly 20.

Specifically, the thermally conductive beam 12 may adopt a solid beam or a hollow beam, and use of the hollow beam has better thermal conduction efficiency. A cross section of the thermally conductive beam 12 may be rectangular, trapezoidal or C-shaped, etc., and its upper surface may be set to be flat so as to fix the thermally conductive cover 3 on the upper surface of the thermally conductive beam 12. Optionally, the thermally conductive cover 3 may also be fixed on a side surface of the thermally conductive beam 12. The thermally conductive beam 12 may be designed as a continuous structure in its extension direction, or may be designed as a segmented structure.

In this embodiment, the thermally conductive beam 12 and the thermally conductive cover 3 are provided, so that while the temperature control component 13 adjusts temperature at the bottom of the case 11, the heat can be transferred to the thermally conductive beam 12 and the thermally conductive cover 3 in sequence, which changes a thermal conduction path of temperature adjustment and control on the battery assembly 20 by the temperature control component 13, can balance temperature distribution in the first chamber A along the height direction of the battery pack, reduces a temperature difference between upper and lower regions of the battery assembly 20, and improves the extent of temperature uniformity of the battery assembly 20, so as to make consistency of a depth of discharge of the battery assembly 20 improved. Moreover, the thermally conductive cover 3 can also restrain the battery assembly 20 from expanding in the height direction of the battery pack. Both of these advantages can increase a service life of the battery pack.

Further, as shown in FIG. 1, the battery pack may further include a thermal barrier layer 6 disposed between a bottom surface of the battery assembly 20 and an inner bottom surface of the case 11. A thermal conductivity coefficient of the thermal barrier layer 6 is smaller than a thermal conductivity coefficient of the thermally conductive beam 12 or the thermally conductive cover 3, which can hinder heat transfer between the temperature control component 13 and the bottom of the battery assembly 20, delay a temperature adjustment effect of the temperature control component 13 on the bottom of the battery assembly 20, and prevent the temperature control component 13 from directly adjusting temperature of the battery cells 2 through a bottom bearing surface of the case 11. It should be noted that it is not required that the thermal barrier layer 6 is completely heat-insulated, as long as thermal conduction efficiency can be reduced, and a non-metallic material is preferred. For example, the thermal barrier layer 6 may adopt glass fiber, asbestos, rock wool, silicate or aerogel felt. More preferably, the thermal barrier layer 6 also has a function of an adhesive, so as to reliably fix the battery cells 2 in the case 11 and improve structural strength of the whole battery pack.

In this embodiment, the thermal barrier layer 6 is provided to enable heat released by the temperature control component 13 to be first transferred to the thermally conductive beam 12 and the thermally conductive cover 3 in sequence before a temperature adjustment effect of the temperature control component 13 reaches the bottom of the battery assembly 20, so that temperature of the bottom of the case 11, the thermally conductive beam 12 and the thermally conductive cover 3 are uniform, and as a result, the heat can be substantially transferred from different surfaces of the battery assembly 20 to the battery assembly 20 at the same time, thereby further reducing a temperature difference of the battery assembly 20 along the height direction of the battery pack and increasing a service life of the battery pack.

Figure 2:
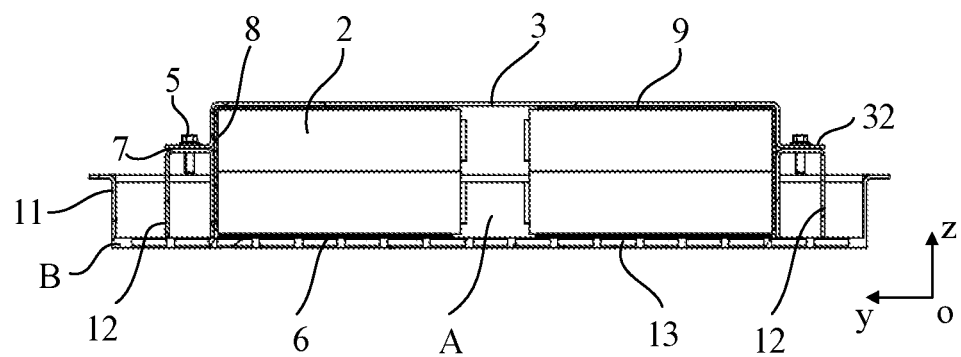
FIG. 2 is a front view of the battery pack shown in FIG. 1.

As shown in FIG. 2, the battery assembly 20 includes two layers of battery cells 2 in the height direction of the battery pack, and the thermal barrier layer 6 is disposed between the bottom layer of battery cells 2 and the inner bottom surface of the case 11. The thermal barrier layer 6 can be configured as a whole piece to sufficiently hinder the heat transfer between the temperature control component 13 and the bottom of the battery assembly 20, so that the heat can quickly reach the top of the battery assembly 20 through the thermally conductive beam 12 and the thermally conductive cover 3. Alternatively, for a structure in which the battery assembly 20 includes a plurality of groups of battery cells 2, a thermal barrier layer 6 can be disposed between a bottom surface of each group of battery cells 2 and the inner bottom surface of the case 11, which can save the material amount of the thermal barrier layer 6, also enable heat released by the temperature control component to be transferred to the top of the battery assembly 20 through a space between adjacent groups of battery cells 2, and reduce a temperature difference between upper and lower regions in the first chamber A.

Preferably, a ratio of a thickness of the thermal barrier layer 6 to a height of the thermally conductive beam 12 ranges from 1/5 to 1/500, for example, 1/5, 1/10, 1/30, 1/40, 1/50, 1/60, 1/70, 1/80, 1/90, 1/100, 1/200, 1/300, 1/400 or 1/500, etc.

Preferably, a ratio of a thermal conductivity coefficient of the thermal barrier layer 6 to a thermal conductivity coefficient of the thermally conductive beam 12 or the thermally conductive cover 3 ranges from 0.001 to 0.5, for example, 0.001, 0.01, 0.1, 0.2, 0.3, 0.4, or 0.5, etc.

In some embodiments, a preset gap can be set between the thermally conductive cover 3 and the thermally conductive beam 12 to conduct heat through air. In other embodiments, the thermally conductive cover 3 and the thermally conductive beam 12 adopt contact heat conduction, which can reduce heat transfer time between the thermally conductive beam 12 and the thermally conductive cover 3, improve thermal conductivity efficiency, and shorten time required for temperature adjustment to reach a stable state.

For example, as shown in FIG. 1, the thermally conductive cover 3 includes a main body part 31 and a mounting part 32 connected to the main body part 31, and the main body part 31 covers the battery assembly 20. For example, the battery assembly 20 includes at least two layers of battery cells 2, the main body part 31 can cover the topmost layer of battery cells 2, and the mounting part 32 is fixedly connected to the thermally conductive beam 12. For example, the thermally conductive cover 3 may be formed by bending a flat plate structure. The thermally conductive cover 3 and the thermally conductive beam 12 may be in direct contact, or the battery pack further includes a first thermally conductive layer 7 disposed between the mounting part 32 and the thermally conductive beam 12. The first thermally conductive layer 7 may be formed by filling thermal conductive glue. The thermal conductive glue can eliminate a gap between the mounting part 32 and the thermally conductive beam 12. Compared with a direct contact method, thermal conductivity efficiency can be improved to enable a temperature adjustment effect of the temperature control component 13 to be transferred to the main body part 31 through the thermally conductive beam 12 and the mounting part 32 more quickly, so that heat is transferred from the main body part 31 to a top surface of the battery assembly 20; in addition, since the top surface of the battery assembly 20 has a larger thermal conduction area, a temperature difference between upper and lower regions of the battery assembly 20 can be balanced.

As shown in FIG. 2, the main body part 31 of the thermally conductive cover 3 protrudes in a direction away from the battery cells 2 relative to the mounting part 32 as a whole. This structure can not only reduce an installation height of the thermally conductive beam 12 and ensure strength of the thermally conductive beam 12, but also can prevent a fastener 5 from protruding from a top surface of the main body part 31 when the mounting part 32 and the thermally conductive beam 12 are fixed by the fastener 5, and can reduce the height of the battery pack.

For this structure, in some embodiments, the main body part 31 dads top surfaces and part of side surfaces of the battery cells 2 at the same time. As shown in FIG. 2, the battery assembly 20 is provided with two groups of battery cells 2 along the width direction (y direction) of the battery pack, and poles of the two groups of battery cells 2 are arranged oppositely, and there is a preset interval between the two groups of battery cells 2 for setting a bus bar. In order to reduce space occupied by the battery pack in a grouping direction of the battery assembly 20, the thermally conductive beam 12 and a side surface of the battery assembly 20 adopt contact heat conduction, and/or the main body part 31 and a side surface of the battery assembly 20 adopt contact heat conduction. This manner can reduce heat transfer time between the thermally conductive beam 12 and the main body part 31, and the side surface of the battery assembly 20, improve thermal conduction efficiency, and shorten time required for temperature adjustment to reach a stable state.

The thermally conductive cover 3 and the thermally conductive beam 12 may also be in direct contact with the battery assembly 20. Alternatively, as shown in FIG. 1, the battery pack may further include a second thermally conductive layer 8, and the second thermally conductive layer 8 is disposed between the thermally conductive cover 3 and the thermally conductive beam 12, and a side surface of the battery assembly 20. The second thermally conductive layer 8 may be formed by filling thermal conductive glue, and the thermal conductive glue can eliminate gaps between the thermally conductive cover 3 and the thermally conductive beam 12, and the side surface of the battery assembly 20. Compared with a direct contact method, this manner can improve thermal conductivity efficiency and allow a temperature adjustment effect of the temperature control component 13 to be simultaneously transferred to the side surface of the battery assembly 20 through the thermally conductive beam 12 and the main body part 31 so as to improve temperature adjustment efficiency.

Optionally, on the basis of FIG. 2, in order to improve explosion-proof safety, two groups of battery cells 2 are disposed opposite to each other on a surface away from the pole, respectively. The thermally conductive beam 12 is kept at a preset distance from the side surface of the battery assembly 20, which can conduct heat through air.

As shown in FIG. 2, the main body part 31 of the thermally conductive cover 3 and the top surface of the battery assembly 20 may also be in direct contact. Alternatively, as shown in FIG. 2, the battery pack may further include a third thermally conductive layer 9 disposed between the thermally conductive cover 3 and the top surface of the battery assembly 20, and the third thermally conductive layer 9 may be formed by filling thermally conductive glue. Preferably, the main body part 31 may completely cover top surfaces of various battery cells 2 to increase temperature adjustment capability on the top of the battery assembly 20.

Preferably, a ratio of a thickness of the first thermally conductive layer 7, the second thermal conductive layer 8 and/or the third thermally conductive layer 9 to a thickness of the thermal barrier layer 6 ranges from 0.0001 to 0.1, for example, 0.0001, 0.001, 0.01 or 0.1; and/or a ratio of a thermal conductivity coefficient of the first thermally conductive layer 7, the second thermally conductive layer 8 and/or the third thermally conductive layer 9 to a thermal conductivity coefficient of the thermal barrier layer 6 ranges from 20 to 1000, for example, 20, 50, 100, 200, 300, 400, 500, 600, 700, 800, 900 or 1000, etc.

The first thermally conductive layer 7, the second thermally conductive layer 8 and/or the third thermally conductive layer 9 in the above embodiments can make temperature of the temperature control component 13 evenly distributed to a height space of the first chamber A through the thermally conductive beam 12 and the thermally conductive cover 3, so that uniformity of temperature throughout the battery assembly 20 is improved. In addition, each thermally conductive layer can also function as an adhesive, so as to improve reliability of fixing each battery cell 2 and improve structural strength of the battery assembly 20. Moreover, when the battery pack is used in a vehicle, the vehicle will transfer vibration to the battery pack during driving, and the first thermally conductive layer 7, the second thermally conductive layer 8 and/or the third thermally conductive layer 9 can also play a role in buffering the vibration, thereby improving working reliability of the battery assembly 20.

As shown in FIG. 1, the battery pack of the present application may further include a cover body 4 disposed on the top of the thermally conductive cover 3, covered to the opening end of the case 11, and fixed and sealed with the case 11. The cover body 4 and the thermally conductive cover 3 are provided independently, which can play the role of closing the case 11. Moreover, since the thermally conductive cover 3 is provided, deformation of the cover body 4 can be reduced, thereby improving sealing performance of the battery pack.

There is a preset gap between an inner surface of the cover body 4 and an outer surface of the thermally conductive cover 3. By reserving an expansion space for the battery assembly 20, a force generated after deformation of the thermally conductive cover 3 can be prevented from being transferred to the cover body 4 to force the cover body 4 to deform as well; moreover, even if the battery assembly 20 expands to cause the thermally conductive cover 3 to deform and push against the cover body 4, the cover body 4 can also further restrict the deformation of the thermally conductive cover 3 and the expansion of the battery assembly 20. Preferably, for battery packs of different sizes, the preset gap ranges from 2 mm to 100 mm.

Specifically, as shown in FIG. 1, in order to realize fixation of the cover body 4 and the case 11, a first flange 111 is disposed around the opening end of the case 11, and a second flange 41 is disposed around the cover body 4. The first flange 111 and the second flange 41 may be fixed by means of bonding or fastener connection. For example, the first flange 111 is provided with a plurality of first holes 112 at intervals, and the second flange 41 is provided with a plurality of fourth holes 411 at intervals, and the fourth holes 411 and the first holes 112 are penetrated by a fastener 5 to realize the fixation of the cover body 4 and the case 11.

In order to realize fixation of the thermally conductive cover 3 and the thermally conductive beam 12, the mounting part 32 is provided with a plurality of third holes 321 at intervals along an extension direction of the thermally conductive beam 12, and the top of the thermally conductive beam 12 is provided with a plurality of second holes 121 at intervals along its extension direction. The third holes 321 and the second holes 121 are penetrated by the fastener 5 to fix the thermally conductive cover 3 and the thermally conductive beam 12.

Optionally, extension parts may also be provided at two opposite ends of the thermally conductive cover 3 so that the thermally conductive cover 3 is fixed with the case 11 through the extension parts. This structure can omit the cover body 4 so as to simplify the structure of the battery pack and reduce the weight.

As shown in FIG. 1, the battery assembly 20 is divided into at least two groups in a plane perpendicular to the height direction of the battery pack, and a grouping direction is perpendicular to an extension direction of the thermally conductive beam 12. Various groups of battery cells 2 can be disposed at intervals.

By arranging the battery assembly 20 in groups, when some battery cells 2 work to generate a large amount of heat and thermal runaway occurs, the heat can be delayed to diffuse towards battery cells of other groups and working safety of the battery assembly 20 is improved, so that even if some battery cells 2 cannot work normally, the battery pack can also be used at a reduced power. Moreover, the grouping direction is perpendicular to the extension direction of the thermally conductive beam 12, so that various groups of battery cells 2 can be continuously arranged along the extension direction of the thermally conductive beam 12. Because the thermally conductive beam 12 and the battery cells 2 of the corresponding group have a continuous thermally conductive region, a temperature adjustment effect of the temperature control component 13 can be efficiently transferred to other regions other than the bottom of the battery assembly 20 through the thermally conductive beam 12. Optionally, the grouping direction of the battery assembly 20 may also be the same as the extension direction of the thermally conductive beam 12.

As shown in FIG. 1, the case 11 is rectangular, and the thermally conductive beam 12 extends along a length direction of the case 11. Such a structure can increase the length of the thermally conductive beam 12, so that a temperature adjustment effect of the temperature control component 13 is more efficiently transferred to the battery assembly 20 through the thermally conductive beam 12. Optionally, the thermally conductive beam may also extend along a width direction of the case 11.

Figure 3:
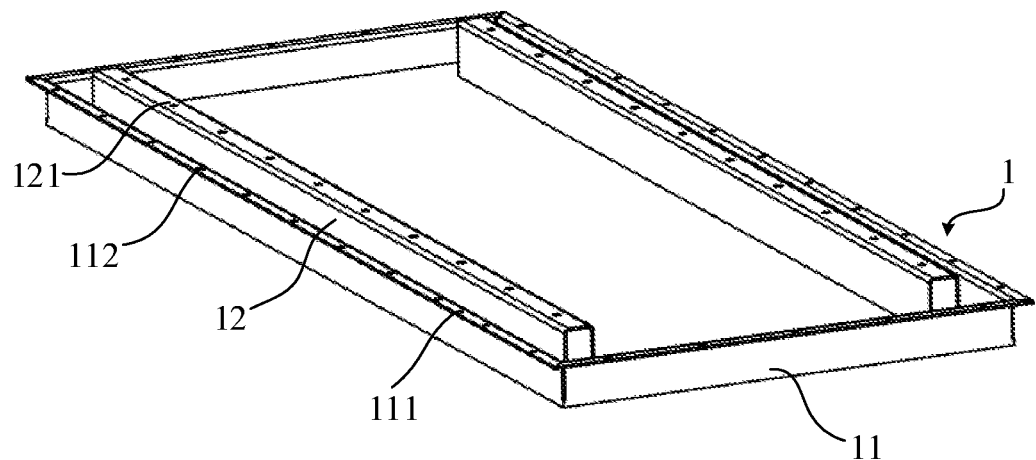
FIG. 3 is a schematic structural diagram of an embodiment of a case assembly in the battery pack shown in FIG. 1.
Figure 4:
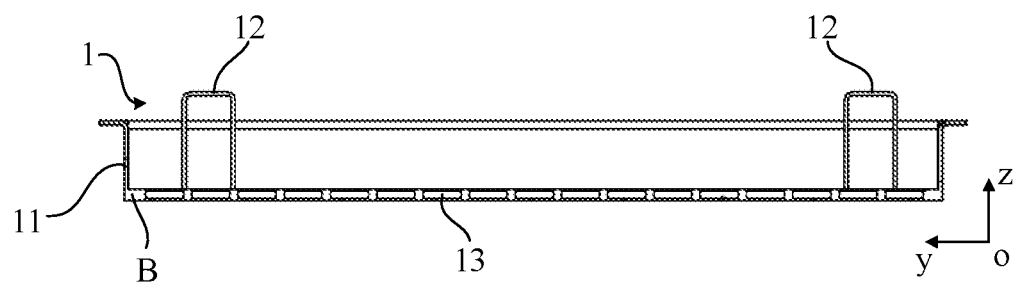
FIG. 4 is a front view of the case assembly shown in FIG. 3.

As shown in FIGS. 3 and 4, the case 11 is provided with two thermally conductive beams 12 extending along the length direction of the case 11. Each battery cell 2 is located between the two thermally conductive beams 12, and the thermally conductive beams 12 and inner side walls of the case 11 may be disposed at intervals. Further, in order to optimize a thermal conduction effect and shorten time required for temperature adjustment to reach a stable state, a rectangular ring-shaped thermally conductive beam 12 may also be provided to surround the outer periphery of the battery assembly 20. At the same time, the shape of the mounting part 32 of the thermally conductive cover 3 is adapted to the thermally conductive beam 12. Alternatively, a thermally conductive beam 12 may also be disposed between adjacent groups of battery cells 2.

Figure 5:
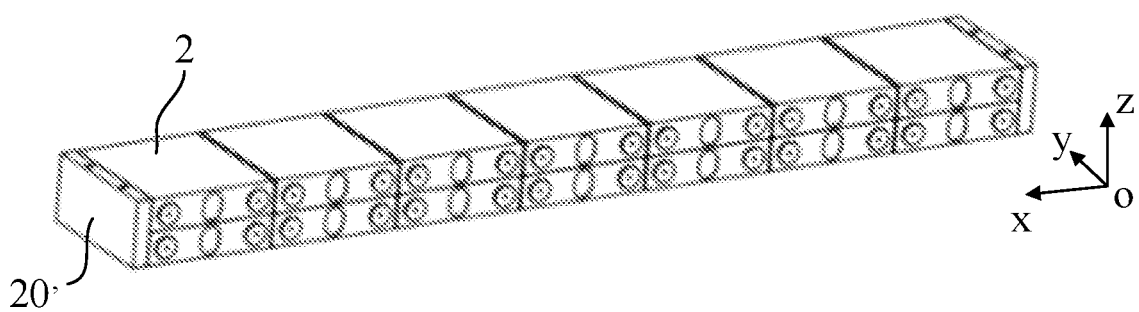
FIG. 5 is a schematic structural diagram of a plurality of battery cells in the battery pack shown in FIG. 1 disposed in a stacking manner along a height direction.
Figure 6:
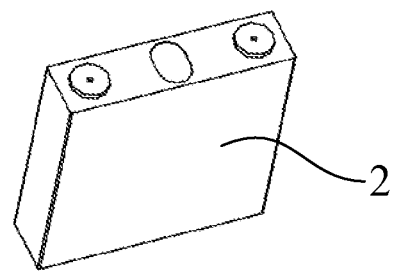
FIG. 6 is a schematic structural diagram of a single battery cell in the battery pack shown in FIG. 1.
Figure 7:
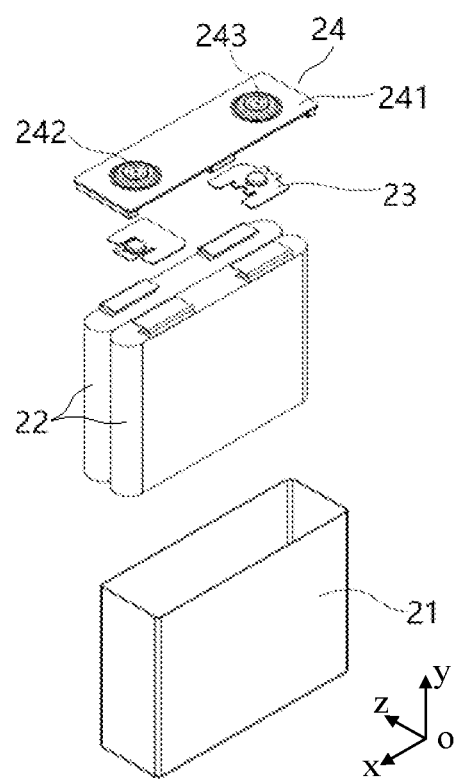
FIG. 7 is a schematic exploded diagram of an embodiment of a battery cell in a battery pack.

As shown in FIG. 5, it is a schematic structural diagram of a single group of battery cells 2, FIG. 6 is a schematic structural diagram of a single battery cell, and FIG. 7 is a schematic exploded diagram of a single battery cell. Each battery cell 2 includes: a housing 21 and an electrode assembly 22 disposed in the housing 21. The housing 21 may have a hexahedral shape or other shapes, and have an opening. The electrode assembly 22 is accommodated in the housing 21. The opening of the housing 21 is covered with a cover plate assembly 24. The cover plate assembly 24 includes a cover plate 241 and two electrode terminals disposed on the cover plate. The two electrode terminals are a first electrode terminal 242 and a second electrode terminal 243, respectively. The first electrode terminal 242 may be a positive electrode terminal, and the second electrode terminal 243 may be a negative electrode terminal. In other embodiments, the first electrode terminal 242 may also be a negative electrode terminal, and the second electrode terminal 243 may be a positive electrode terminal. An adapter plate 23 is disposed between the cover plate assembly 24 and the electrode assembly 22, and an electrode tab of the electrode assembly 22 is electrically connected to an electrode terminal on the cover plate 241 through the adapter plate 23. In this embodiment, there are two adapter plates 23, namely, a positive electrode adapter plate and a negative electrode adapter plate, respectively.

As shown in FIG. 7, two electrode assemblies 22 are disposed in the housing 21, and the two electrode assemblies 22 are stacked along a height direction (z direction) of a battery cell 2, where the height direction of the battery cell 2 is the same as the height direction of the battery pack. Certainly, in other embodiments, one electrode assembly 22 may also be disposed in the housing 21, or more than three electrode assemblies 22 may be disposed in the housing 21. The plurality of electrode assemblies 22 are stacked in the height direction (z direction) of the battery cell 2.

Figure 8:
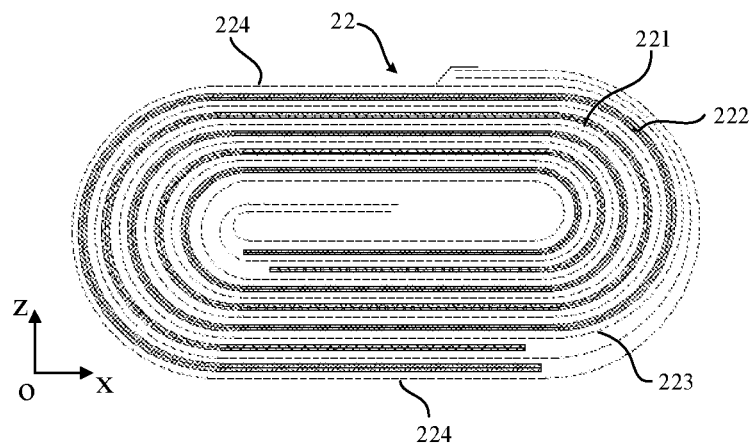
FIG. 8 is a cross-sectional view of a battery cell using a coiled electrode assembly along an x-z plane in FIG. 7.
Figure 9:
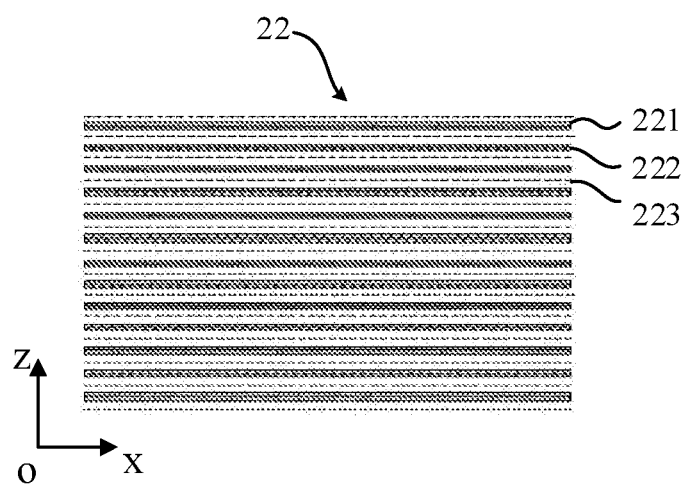
FIG. 9 is a cross-sectional view of a battery cell using a laminated electrode assembly along an x-z plane in FIG. 7.

As shown in FIGS. 8 and 9, the electrode assembly 22 includes a first electrode sheet 221, a second electrode sheet 222 and a diaphragm 223 disposed between the first electrode sheet 221 and the second electrode sheet 222. The first electrode sheet 221 may be a positive electrode sheet, and the second electrode sheet 222 may be a negative electrode sheet. In other embodiments, the first electrode sheet 221 may also be a negative electrode sheet, and the second electrode sheet 222 may be a positive electrode sheet. The diaphragm 223 is an insulator between the first electrode sheet 221 and the second electrode sheet 222. An active material of the positive electrode sheet may be coated on a coating zone of the positive electrode sheet, and an active material of the negative electrode sheet may be coated on a coating zone of the negative electrode sheet. A portion extending from the coating zone of the positive electrode sheet serves as a positive electrode tab; and a portion extending from the coating zone of the negative electrode sheet serves as a negative electrode tab. The positive electrode tab is connected to the positive electrode terminal on the cover plate assembly 24 through a positive electrode adapter plate. Similarly, the negative electrode tab is connected to the negative electrode terminal on the cover plate assembly 24 through a negative electrode adapter plate.

As shown in FIG. 8, the electrode assembly 22 is in a coiled structure. The first electrode sheet 221, the diaphragm 223 and the second electrode sheet 222 are all belt-shaped structures. The first electrode sheet 221, the diaphragm 223 and the second electrode sheet 222 are stacked in sequence and coiled more than two turns to form the electrode assembly 22, and the electrode assembly 22 is in a flat shape. When the electrode assembly 22 is produced, the electrode assembly 22 may be directly coiled into a flat shape, or may be coiled into a hollow cylindrical structure first, and then flattened into a flat shape after the coiling. FIG. 8 is a schematic diagram of an outline of an electrode assembly 22. An outer surface of the electrode assembly 22 includes two flat surfaces 224, and the two flat surfaces 224 are arranged oppositely along the height direction (z direction) of the battery cell 2. The electrode assembly 22 is in a substantially hexahedral structure, and the flat surfaces 224 are substantially parallel to a coiling axis and are outer surfaces with the largest area. The flat surfaces 224 may be relatively flat surfaces, and are not required to be pure planes.

As shown in FIG. 9, the electrode assembly 22 is in a laminated structure, that is, the electrode assembly 22 includes a plurality of first electrode sheets 221, a plurality of second electrode sheets 222, and a diaphragm 223 is disposed between the first electrode sheet 221 and the second electrode sheet 222. The first electrode sheet 221 and the second electrode sheet 222 are disposed in a stacking manner along the height direction (z direction) of the battery cell 2.

Based on the structure of the battery cell 2 described above, the flat surfaces 224 of the electrode assembly 22 or a plane where the first electrode sheet 221 is located is disposed to face a bottom surface of the case 11, and various battery cells 2 are provided with a single layer or at least two layers disposed in a stacking manner along the height direction. Various battery cells 2 may be fixed by bonding. Two ends of a single group of battery cells 2 in a horizontal plane along a stacking direction may be provided with plates 20', which can limit the single group of battery cells 2 and protect the battery cells 2, and can also function to insulate the battery cells 2 from the case 11 and the cover body 4 when an insulating material is used.

This arrangement can increase contact areas between the bottom of the case 11 and the thermally conductive cover 3, and the battery cell 2, thereby improving thermal conduction efficiency, and improving efficiency of temperature adjustment on the battery assembly 20. Moreover, the electrode assembly 22 will inevitably expand along a thickness direction of an electrode sheet during charging and discharging processes. Expansion of various electrode sheets is superimposed, and accumulated expansion in the height direction is greater than that in other directions. The thermally conductive cover 3 can also restrict the direction of the maximum expansion of the battery cell 2 to prevent the battery pack from deforming and further increase a service life of the battery pack. In addition, this manner can make the posture of the battery cell 2 more stable during stacking and installation processes, which is beneficial to assembly operation.

In addition, the temperature control component 13 can adopt various installation methods. For example, the temperature control component 13 is provided on an outer bottom surface of the case 11 to transfer heat through the bottom of the case 11.

Alternatively, as shown in FIG. 4, the case 11 is provided with a second chamber B, the temperature control component 13 is disposed in the second chamber B, the second chamber B is located at the bottom of the first chamber A, and the second chamber B is isolated from the first chamber A. This structure enables the first chamber A and the second chamber B to be independently provided. For a structure in which the temperature control component 13 uses liquid for heating or cooling, if liquid leakage occurs in the temperature control component, the liquid will not flow into the first chamber A, which can avoid safety accidents caused by the battery assembly 20 soaking in water, and improve safety of the battery pack.

FIGS. 10 to 13 are schematic structural diagrams of another embodiment of a battery pack of the present application. The battery pack 200 differs from the battery pack 100 shown in FIGS. 1 to 9 in that various battery cells 2 are stacked in a different manner.

Figure 10:
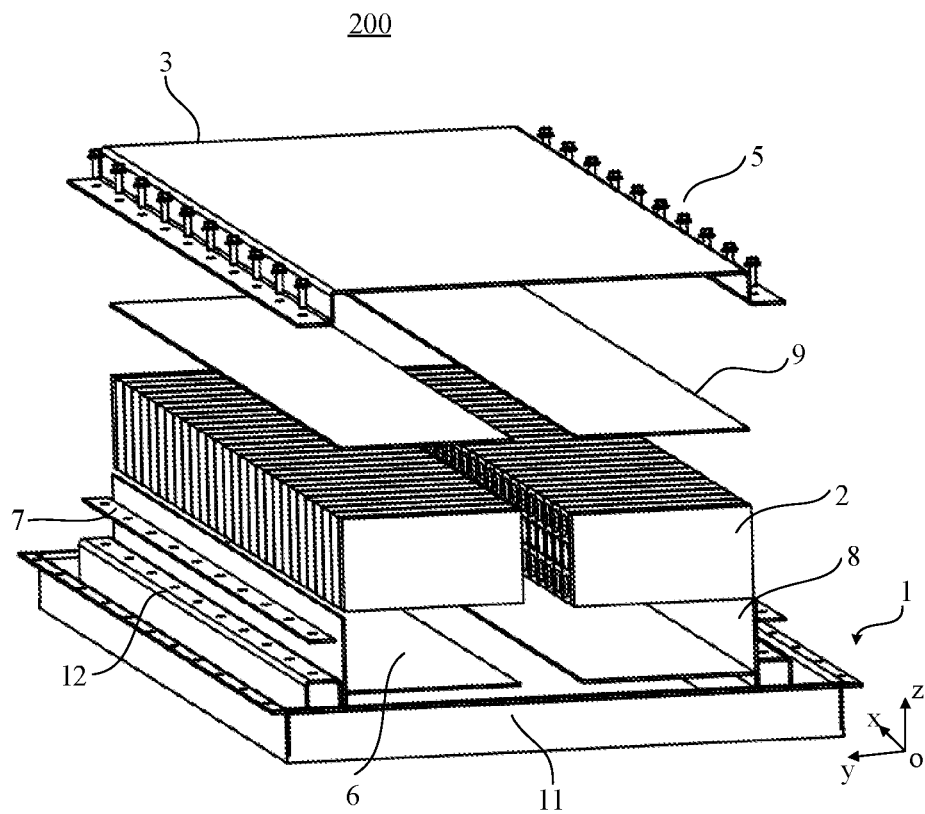
FIG. 10 is a schematic exploded diagram of another embodiment of a battery pack of the present application.
Figure 11:
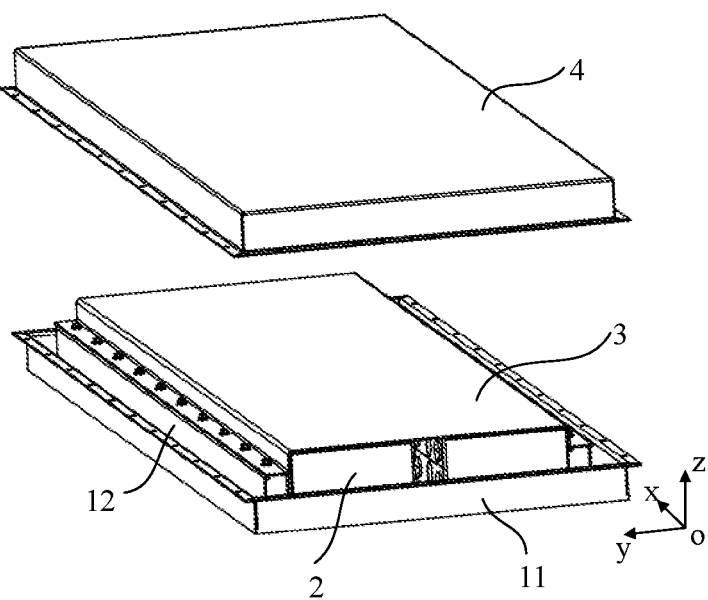
FIG. 11 is a schematic diagram of a state in which a cover body of the battery pack shown in FIG. 10 is opened.

As shown in FIG. 10 and FIG. 11, the battery cell 2 includes a housing and an electrode assembly disposed in the housing, and the battery cell 2 is in a side-standing state. Flat surfaces 224 of the electrode assembly 22 or a plane where a first electrode sheet 221 is located is disposed to face a side surface of a case 11, and a plurality of battery cells 2 are disposed in a stacking manner along a length direction or a width direction of the case 11. In order to improve stability of arrangement of the plurality of battery cells 2, preferably, only one layer of battery cells 2 are disposed in a height direction of the battery pack. This arrangement can allow various battery cells 2 to be in contact with a bottom surface of the case 11 and a thermally conductive cover 3 at the same time, so that temperature between the various battery cells 2 is more uniform, and overall working performance of the battery pack is improved; moreover, more battery cells 2 can be arranged in a single layer, which can reduce the number of layers in a height direction, and is beneficial to thermal conduction.

Figure 12:
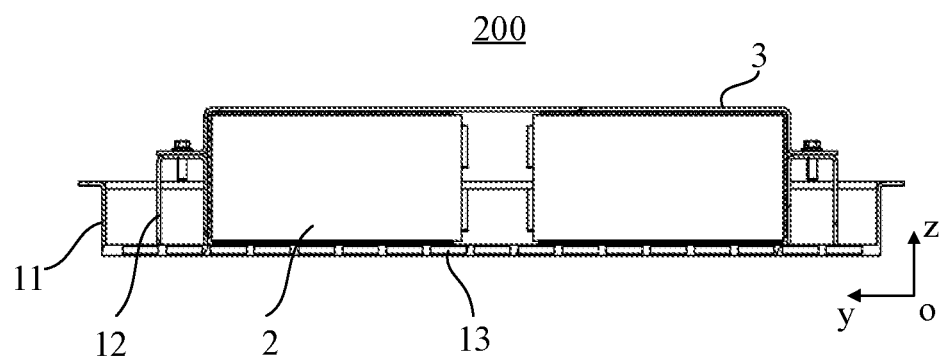
FIG. 12 is a front view of the battery pack shown in FIG. 10.
Figure 13:
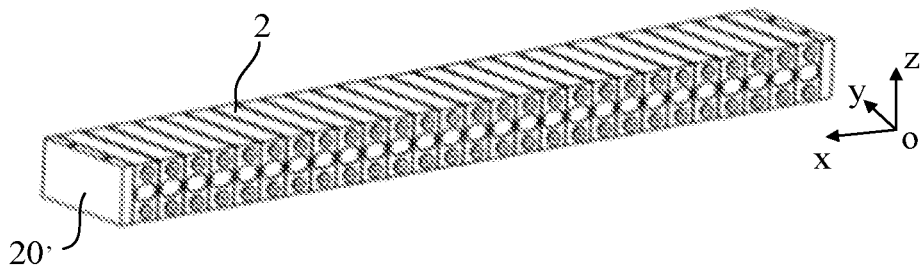
FIG. 13 is a schematic structural diagram of a plurality of battery cells in the battery pack shown in FIG. 10 stacked along a length direction.

FIG. 12 is a front view of the battery pack shown in FIG. 10, and FIG. 13 is a schematic diagram of a single group of battery cells 2, and a plurality of battery cells 2 in the single group are stacked in sequence along an extension direction of a thermally conductive beam 12.

In addition, the present application further provides a method for manufacturing the above-mentioned battery pack, including:
 providing a case assembly (1) including a case (11), a thermally conductive beam (12) and a temperature control component (13), the thermally conductive beam (12) being disposed in the case (11) and connected to the case (11), and the temperature control component (13) being disposed in a bottom region of the case (11);
 providing a thermally conductive cover (3) connected to the thermally conductive beam (12) and located above the thermally conductive beam (12) along a height direction of the battery pack, where the thermally conductive cover (3), the case (11) and the thermally conductive beam (12) enclose and form a first chamber (A); and
 providing a plurality of battery cells (2) integrally forming a battery assembly (20), the battery assembly (20) being disposed in the first chamber (A) and located above the temperature control component (13).

The battery pack and the vehicle provided by the present application are described in detail above. Specific embodiments are applied in this text to describe principles and implementation manners of the present application. The description of the above embodiments is only used to help understand the method and core idea of the present application. It should be pointed out that for those of ordinary skill in the art, without departing from the principles of the present application, several improvements and modifications can be made to the present application, and these improvements and modifications also fall within the protection scope of the claims of the present application.

What is claimed is:

1. A battery pack, comprising:
 a case assembly comprising a case, a thermally conductive beam and a temperature control component, the thermally conductive beam being disposed in the case and connected to a bottom region of the case, and the temperature control component being disposed in the bottom region of the case;
 a thermally conductive cover connected to the thermally conductive beam and located above the thermally conductive beam along a height direction of the battery pack, wherein the thermally conductive cover, the case and the thermally conductive beam enclose and form a first chamber; and
 a plurality of battery cells integrally forming a battery assembly, the battery assembly being disposed in the first chamber and located above the temperature control component;
 wherein the thermally conductive cover and a top surface of the battery assembly adopt thermal contact heat transfer; and
 at least one of the thermally conductive beam and the thermally conductive cover, and a side surface of the battery assembly away from a pole adopt thermal contact heat transfer.

2. The battery pack according to claim 1, further comprising a thermal barrier layer disposed between a bottom surface of the battery assembly and an inner bottom surface of the bottom region of the case, wherein a thermal conductivity coefficient of the thermal barrier layer is smaller than a thermal conductivity coefficient of the thermally conductive beam or the thermally conductive cover.

3. The battery pack according to claim 2, wherein
a ratio of a thickness of the thermal barrier layer to a height of the thermally conductive beam ranges from 1/5 to 1/500; and/or
a ratio of the thermal conductivity coefficient of the thermal barrier layer to the thermal conductivity coefficient of the thermally conductive beam or the thermally conductive cover ranges from 0.001 to 0.5.

4. The battery pack according to claim 1, wherein the thermally conductive cover and the thermally conductive beam adopt thermal contact heat conduction transfer.

5. The battery pack according to claim 1, wherein the thermally conductive cover comprises a main body part and a mounting part connected to the main body part, the main body part covers the battery assembly, and the mounting part is fixedly connected to the thermally conductive beam; and
the battery pack further comprises a first thermally conductive layer disposed between the mounting part and the thermally conductive beam.

6. The battery pack according to claim 5, further comprising a thermal barrier layer disposed between a bottom of the battery assembly and an inner bottom surface of the case; and
a ratio of a thickness of the first thermally conductive layer to a thickness of the thermal barrier layer ranges from 0.0001 to 0.1; and/or
a ratio of a thermal conductivity coefficient of the first thermally conductive layer to a thermal conductivity coefficient of the thermal barrier layer ranges from 20 to 1000.

7. The battery pack according to claim 1, wherein the thermally conductive cover comprises a main body part and a mounting part connected to the main body part, the main body part covers the battery assembly, and the mounting part is fixedly connected to the thermally conductive beam; and
the battery pack further comprises a second thermally conductive layer disposed between the main body part and the thermally conductive beam, and a side surface of the battery assembly away from a pole.

8. The battery pack according to claim 7, further comprising a thermal barrier layer disposed between a bottom of the battery assembly and an inner bottom surface of the case; and
a ratio of a thickness of the second thermally conductive layer to a thickness of the thermal barrier layer ranges from 0.0001 to 0.1; and/or
a ratio of a thermal conductivity coefficient of the second thermally conductive layer to a thermal conductivity coefficient of the thermal barrier layer ranges from 20 to 1000.

9. The battery pack according to claim 1, wherein the thermally conductive cover comprises a main body part and a mounting part connected to the main body part, the main body part covers the battery assembly, and the mounting part is fixedly connected to the thermally conductive beam; and
the battery pack further comprises a third thermally conductive layer disposed between the main body part and a top surface of the battery assembly.

10. The battery pack according to claim 9, further comprising a thermal barrier layer disposed between a bottom of the battery assembly and an inner bottom surface of the case; and
a ratio of a thickness of the third thermally conductive layer to a thickness of the thermal barrier layer ranges from 0.0001 to 0.1; and/or
a ratio of a thermal conductivity coefficient of the third thermally conductive layer to a thermal conductivity coefficient of the thermal barrier layer ranges from 20 to 1000.

11. The battery pack according to claim 1, further comprising a cover body disposed on the top of the thermally conductive cover, fixed and sealed with the case.

12. The battery pack according to claim 1, wherein the battery cell comprises a housing and an electrode assembly disposed in the housing, and the electrode assembly comprises a first electrode sheet, a second electrode sheet, and a diaphragm disposed between the first electrode sheet and the second electrode sheet;
wherein the electrode assembly is in a coiled structure and is flat-shaped, and an outer surface of the electrode assembly comprises two flat surfaces; or, the electrode assembly is in a laminated structure, and the first electrode sheet and the second electrode sheet are disposed in a stacking manner; and
the flat surfaces of the electrode assembly or a plane where the first electrode sheet is located is disposed to face a bottom surface of the case, and the plurality of battery cells are provided with a single layer or at least two layers disposed in a stacking manner along the height direction of the battery pack.

13. The battery pack according to claim 1, wherein the battery cell comprises a housing and an electrode assembly disposed in the housing, and the electrode assembly comprises a first electrode sheet, a second electrode sheet, and a diaphragm disposed between the first electrode sheet and the second electrode sheet;
wherein the electrode assembly is in a coiled structure and is flat-shaped, and an outer surface of the electrode assembly comprises two flat surfaces; or, the electrode assembly is in a laminated structure, and the first electrode sheet and the second electrode sheet are disposed in a stacking manner; and
the flat surfaces of the electrode assembly or a plane where the first electrode sheet is located is disposed to face a side surface of the case, and the plurality of battery cells are disposed in a stacking manner along a length direction or a width direction of the battery pack.

14. The battery pack according to claim 1, wherein the battery assembly is divided into at least two groups in a plane perpendicular to the height direction of the battery pack, and the thermally conductive beam and a side surface of the battery assembly away from a pole adopt contact heat conduction, and a grouping direction of the battery assembly is perpendicular to an extension direction of the thermally conductive beam.

15. A vehicle, comprising:
a vehicle main body; and
a battery pack, wherein the battery pack is disposed in the vehicle main body, and the battery pack comprising:
a case assembly comprising a case, a thermally conductive beam and a temperature control component, the thermally conductive beam being disposed in the case and connected to a bottom region of the case, and the temperature control component being disposed in the bottom region of the case;
a thermally conductive cover connected to the thermally conductive beam and located above the thermally conductive beam along a height direction of the battery pack, wherein the thermally conductive cover, the case and the thermally conductive beam enclose and form a first chamber; and a plurality of battery cells integrally forming a battery assembly, the battery assembly being disposed in the first chamber and located above the temperature control component;

wherein the thermally conductive cover and a top surface of the battery assembly adopt thermal contact heat transfer; and at least one of the thermally conductive beam and the thermally conductive cover, and a side surface of the battery assembly away from a pole adopt thermal contact heat transfer.

16. The vehicle according to claim 15, wherein the battery pack further comprising:

a thermal barrier layer disposed between a bottom surface of the battery assembly and an inner bottom surface of the bottom region of the case, wherein a thermal conductivity coefficient of the thermal barrier layer is smaller than a thermal conductivity coefficient of the thermally conductive beam or the thermally conductive cover.

17. The vehicle according to claim 15, wherein the thermally conductive cover comprises a main body part and a mounting part connected to the main body part, the main body part covers the battery assembly, and the mounting part is fixedly connected to the thermally conductive beam; and the battery pack further comprises a first thermally conductive layer disposed between the mounting part and the thermally conductive beam.

18. A method for manufacturing a battery pack, comprising:

providing a case assembly comprising a case, a thermally conductive beam and a temperature control component, the thermally conductive beam being disposed in the case and connected to a bottom region of the case, and the temperature control component being disposed in the bottom region of the case;

providing a thermally conductive cover connected to the thermally conductive beam and located above the thermally conductive beam along a height direction of the battery pack, wherein the thermally conductive cover, the case and the thermally conductive beam enclose and form a first chamber; and providing a plurality of battery cells integrally forming a battery assembly, the battery assembly being disposed in the first chamber and located above the temperature control component;

wherein the thermally conductive cover and a top surface of the battery assembly adopt thermal contact heat transfer; and at least one of the thermally conductive beam and the thermally conductive cover, and a side surface of the battery assembly away from a pole adopt thermal contact heat transfer.

\* \* \* \* \*